United States Patent

[11] 3,581,281

[72] Inventors Francis C. Martin
Williamsville, N.Y.;
James P. Nicklas, Woodland Hills, Calif.

[21] Appl. No. 626,495
[22] Filed Mar. 28, 1967
[45] Patented May 25, 1971
[73] Assignee Cornell Aeronautical Laboratory, Inc.
Buffalo, N.Y.

[54] PATTERN RECOGNITION COMPUTER
5 Claims, 2 Drawing Figs.

[52] U.S. Cl. .......... 340/146.3, 340/172.5
[51] Int. Cl. .......... G06k 9/06
[50] Field of Search .......... 340/146.3, 172.5

[56] References Cited
UNITED STATES PATENTS
3,325,787 6/1967 Angell et al. .......... 340/172.5

*Primary Examiner*—Maynard R. Wilbur
*Assistant Examiner*—William W. Cochran
*Attorney*—Allen J. Jaffe

ABSTRACT: A pattern recognition digital computer employing stores for combining the addresses of all points on an input matrix that is exposed to a pattern, the addresses being arbitrarily arranged into discrete areas of the stores, at least one predetermined weight value assigned to each of the discrete areas, threshold units for comparing the activity of each of the discrete areas with a predetermined value, response accumulators for receiving the weight values for each of the discrete areas that are above the threshold; and gates, distributors and arithmetic elements for changing the weight values for those discrete areas that contribute to incorrect responses.

| STIMULUS | B | $\bar{B}_1$ | $\bar{B}_2$ | B | $\bar{B}_1$ | $\bar{B}_2$ | B | $\bar{B}_1$ | $\bar{B}_2$ | B | $\bar{B}_1$ | $\bar{B}_2$ |
|---|---|---|---|---|---|---|---|---|---|---|---|---|
| $A_1$ ACTIVITY | 1 | 0 | 1 | 1 | 0 | 1 | 1 | 0 | 1 | 1 | 0 | 1 |
| $A_2$ ACTIVITY | 0 | 1 | 1 | 0 | 1 | 1 | 0 | 1 | 1 | 0 | 1 | 1 |
| CORRECT R | 1 | 0 | 0 | 1 | 0 | 0 | 1 | 0 | 0 | 1 | 0 | 0 |
| $W_1$ - WEIGHT | 0 | 2 | 2 | 1 | 0 | 0 | 0 | 2 | 2 | 1½ | 1½ | 1½ |
| $W_2$ - WEIGHT | 0 | 0 | 0 | -1 | -1 | -1 | -1 | -1 | -1 | -1½ | -1½ | -1½ |
| SUM IN R ($R_{SUM}$) | 0 | 0 | 2 | 1 | -1 | -1 | 0 | -1 | 1 | 1½ | -1½ | 0 |
| THRESHOLD (T) | 1 | 1 | 1 | 1 | 1 | 1 | 1 | 1 | 1 | 1 | 1 | 1 |
| $\Theta = R_{SUM} - T$ | -1 | -1 | 1 | ø½ | -2 | -2 | -1 | -2 | ø½ | ½ | -2½ | -1 |
| $-2\Theta / A_1 + A_2$ | 2 | – | -1 | -1 | – | – | 2 | – | -½ | – | – | – |
| ACTUAL R | 0 | 0 | 1 | | 0 | 0 | 0 | 0 | | 1 | 0 | 0 |

FIG. 2

INVENTOR
FRANCIS C. MARTIN
JAMES P. NICKLAS

INVENTOR

FRANCIS C. MARTIN
JAMES P. NICKLAS

BY

ATTORNEY

PATTERN RECOGNITION COMPUTER

BACKGROUND OF THE INVENTION

The present invention relates to the field of pattern recognition, and more particularly to special purpose pattern recognition digital computers.

The term pattern can be applied to information structures of all kinds including those that are termed signals. A distinction between pattern and signal is usually made on the basis of whether the input signals can be mathematically described in a convenient manner. If such a description is not convenient, then the signal can be referred to as a pattern. Another distinction often made between the two is that a pattern is usually composed of many more elements than a signal.

In general, there are three categories of patterns, to wit, spatial, temporal, and multisensor. An aerial photograph, for example, is a spatial pattern; speech and returns from a tracking radar are temporal patterns. Movies and returns from a search radar are combinations of spatial and temporal patterns. When a pattern combines inputs from many types of sensors, a multisensor pattern is produced. For example, a weather pattern includes inputs of pressure and temperature as well as those of space and time.

If one specific type of pattern is to be classified, then the characteristics of the pattern can be exploited by a single-purpose recognition system.

A special purpose computer would be highly efficient in performing the computations necessary for recognizing one kind of pattern. It would also provide an economical means of operator intervention and quick look displays of partial and final results.

On the other hand, a general purpose digital computer would be a highly flexible machine for research into general pattern recognition techniques. Because of its sequential operation, however, the general purpose computer is usually much less efficient than a special purpose machine for pattern recognition.

It is accordingly a primary object of the present invention to provide a special purpose digital computer for pattern recognition that is highly flexible and efficient.

SUMMARY OF THE INVENTION

Like the pattern recognition system disclosed in U.S. Pat. No. 3,192,505 granted June 29, 1965 and assigned to the assignee of the present invention, the present system is trained on known samples that are representative of the various classes of patterns to be recognized. In the process of learning, the properties of the patterns are weighted. Then, when shown new stimuli, the present system is able to identify them based on what was learned during training.

Unlike other pattern recognizers, the present system does not match an unknown pattern against a stored inventory of similar images or perform mathematical correlations of input characteristics. The memory of the present system is composed of weights, which, in conjunction with logic, produce classification decisions.

Basically, the present recognition system comprises; sensor means responsive to a presented pattern; a plurality of memory elements each adapted to accept and store a portion of the pattern presented to said sensor means, each of said memory elements being arbitrarily assigned to one or more of a plurality of association units; digital storage means containing the addresses of the memory elements that have been assigned to each association unit; means responsive to the addresses in each association unit for determining and summing the content of each of the memory elements therein; threshold means operative upon the total content of all the memory elements assigned to each one of said association units for comparing said total with a predetermined value to deliver an output that is indicative of whether said association unit is active or not; response accumulator means; digital storage means containing one or more predetermined weight values for each association unit; means responsive to the output of said threshold means operative upon the accumulated weight values in said response accumulator means for delivering an output that is indicative of the identity of the pattern which was presented to said sensor means.

BRIEF DESCRIPTION OF THE DRAWINGS

For a fuller understanding of the present invention, reference should be had to the following detailed description of the same taken in conjunction with the accompanying drawings wherein:

FIG. 2 is a chart for illustrating, in a simplified manner, one procedure for training the apparatus of FIG. 1.

DESCRIPTION OF THE PREFERRED EMBODIMENTS

Figure 1:
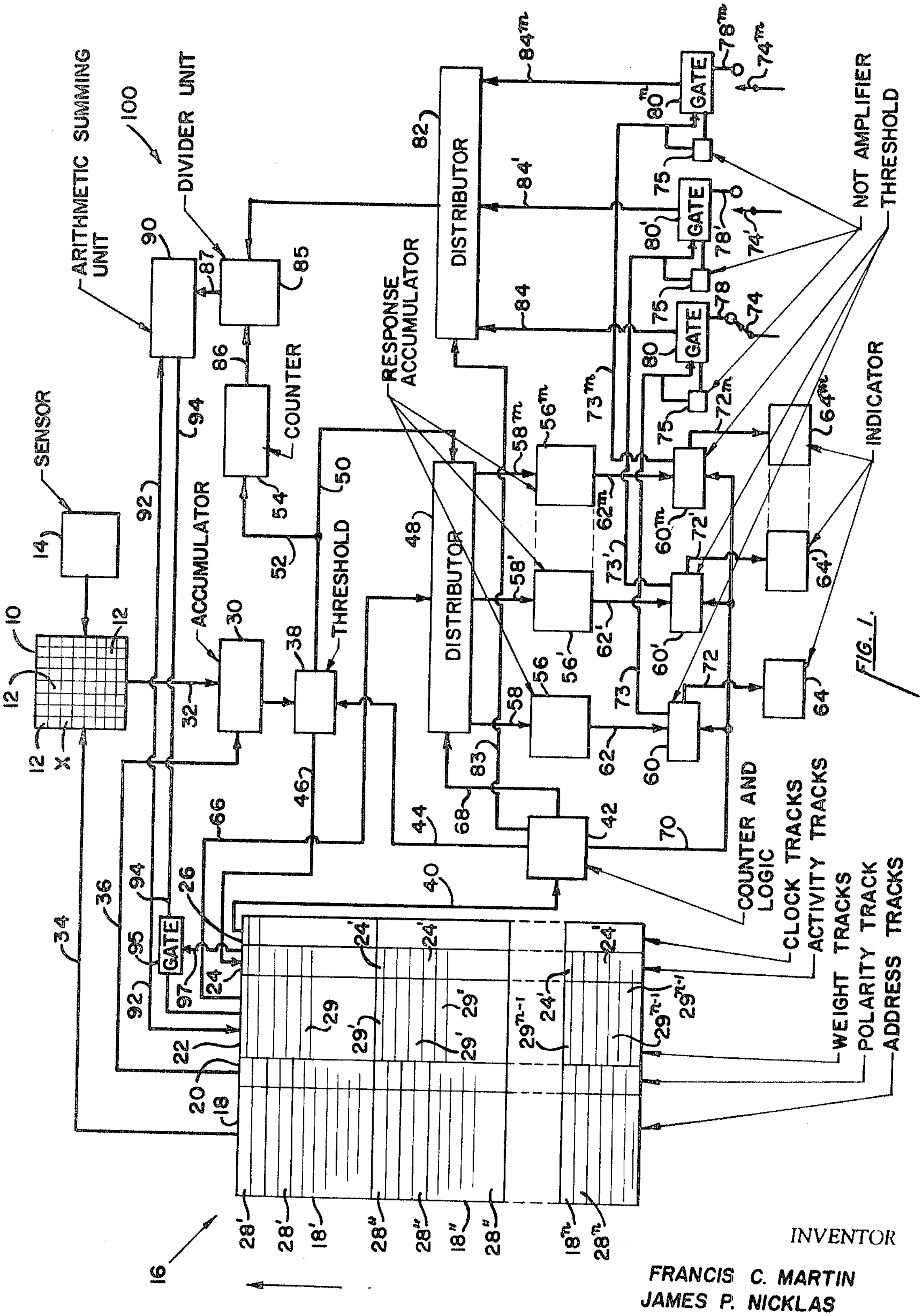
FIG. 1 is a flow diagram of the apparatus according to the present invention with conventional elements shown in block form.

The apparatus illustrated in FIG. 1 is shown as comprising a memory unit 10 having an ordered array of memory elements 12. Each element 12 is adapted to store in digital notation a portion of a pattern that is presented to a sensor unit 14. The unit 14 may be any suitable sensing device, as, for example, a flying spot scanner or a matrix of photoresistor cells. The particular type of sensing unit chosen is unimportant as long as unit 10 represents in digital notation a facsimile of the pattern presented thereto. A magnetic stage drum is shown generally at 16. For ease in explanation, the cylindrical surface of the drum has been developed. As shown a plurality of tracks 18, 20, 22, 24, and 26 extend vertically about the drum surface. Hereinbelow, tracks 18 will be termed the "address" tracks; tracks 20, the "polarity" tracks; tracks 22, the "weight" tracks; track 24, the "activity" track and tracks 26, the "-clock" tracks.

Drum 16 is further divided into horizontal sections or bands 18′, 18″....18ⁿ which serve to divide tracks 18 and 20 into a plurality of subtracks that will be termed "association" units. As can be seen, there are "*n*" association units. Each association unit contains a plurality of horizontal lines or rows 28′, 28″....28ⁿ for storing a digital notation the addresses of memory elements 12. The particular memory elements 12 that are assigned to a particular association unit is a matter of arbitrary choice and the same memory element can contribute to one or more association units. For example, the memory element "*x*" might contribute to association unit 18′ or 18″ or both. In addition, each address row 28′, 28″....28ⁿ is given an arbitrary value that is recorded in polarity track 20. The value may be a number or, as chosen for purposes of the present description, a positive or negative polarity. Thus, the first row 28′ of association unit 18′ may be chosen as positive; the second, negative; the third, positive; and so on. Of course, the record in track 20 will be a signal that represents a digital notation as "1" for positive and "0" for negative.

An accumulator 30, which might be an up-down counter, is electrically connected via line 32 to memory unit 10 for storing and summing the values of the memory elements as they are addressed through line 34 as drum 16 rotates in direction D. A signal from track 20 via line 36 determines whether the counter adds "up" or "down." Operatively associated with accumulator 30 is a threshold unit 38, that is actuated by a signal from clock tracks 26 applied through line 40, counter and logic circuit 42 and control line 44. The signal from counter and logic circuit 42 causes the threshold 38 to compare with a predetermined value, the value stored in accumulator 30 after the addressing of each association unit is completed. Thus, unit 38 would take a threshold after the last row 28′ of association unit band 18′ is addressed and again after the last row 28″ of association unit 18″ is addressed. If the sum in accumulator 30 is greater than the predetermined value, an activity signal is stored in tracks 24 via line 46 and the particular association unit whose memory elements contributed to that sum will be considered active. If the threshold is less than the predetermined value, then no signal will be recorded on track 24, and that particular association unit is considered inactive. The output from unit 38 is also applied to a distributor 48 via a line 50 for a purpose to become apparent hereinbelow. A branch line 52 from line 50 leads from threshold unit 38 to a counter 54 which totals the number of active association units.

A plurality of accumulators 56, 56′....$56^m$, termed "response unit accumulators," are adapted to receive information from distributor 48 via lines 58, 58′....$58^m$. A threshold unit 60, 60′....$60^m$ is operatively associated via lines 62, 62′....$62^m$ with each accumulator for severally delivering an output signal to units 64, 64′....$64^m$ that can be suitable indicating, storage or control means.

The information that distributor 48 delivers to the response accumulators is that which is stored on the weight tracks 22 of drum 16. This information comprises values that will be termed "weights." There are a plurality of such weights for each response accumulator; the precise number depending upon the number of association units. The value of the weights are determined by an adaptive training process to be described hereinbelow. Once the values of a set of weights are determined, they are indicative of the class or classes of patterns the system is to identify. Thus, for example, if there were 50 association units and 10 response accumulators, there would be 500 (50×10) weights stored on tracks 22. These weights are stored on horizontal rows along tracks 22 that are adjacent to the rows 24′ on track 24 that stores the association unit activity. The weights are stored in order of response accumulators for each association unit. In this manner, all the weights from association unit 18′ that contribute to each response accumulator would be stored on rows 29′ adjacent association unit 18″; those from association 18″ that contribute to each response accumulator would be stored adjacent association unit 18‴ (not illustrated) and so on until those weights from association unit $18^n$ are stored adjacent association unit $18^{n+1}$.

The first row of rows 29′ for the weights stored adjacent association unit 18″ contains the weight value that contributes to response accumulator 56 from association unit 18′, the second row contains the weight value that contributes to response accumulator 56′ and so on until the last row of rows 29′ contains the weight value that contributes to response accumulator $56^m$ from association unit 18′.

Similarly, the first row of the rows $29^{n11}$ for the weights stored adjacent association unit $18^n$ contains the weight value that contributes to response accumulator 56 from association unit $18^{n11}$, the second row contains the weight value that contributes to response accumulator 56′ and so on until the last row contains the weight value that contributes to response accumulator $56^m$ from association unit $18^{n11}$. This arrangement is repeated until weights from all association units have contributed to each response accumulator.

The weights for any association unit are located below the addresses for that association unit so that as soon as the last address is read and the activity therefor stored, the weights for the active association units can be rapidly accumulated in the proper response accumulators, thereby greatly reducing the cycle time.

The weights on track 22 are transmitted to distributor 48 by line 66 and are further transferred to the appropriate response accumulator only if the particular association unit is active as determined by line 50 leading to distributor 48. Thus, the weight for response accumulator 56 from association unit 18′, for example, will be transferred to accumulator 56 only if association unit 18′ is active. If it is not, nothing will be transferred. Line 68 from counter and logic unit 42 synchronizes the actuation of distributor 48 with the end of an addressing period of the particular association unit as was the case with threshold 38. An additional line 70 from counter and logic unit 42 leads to the thresholds 60, 60′....$60^m$ for triggering the actuation thereof after each cycle has been completed. Actuation of these thresholds cause the values in each of the response accumulators to be compared with predetermined values to determine whether each accumulator can be considered active or not for delivery of a signal indicative of such activity. The activity signal is transmitted to suitable indicating devices 64, $64^1$....$64^m$ via lines 72, 72′....$72^m$. If the difference between the sum in the response accumulator and the threshold is greater than zero, the signal from the indicator would be "1"; whereas, if the difference was less than zero, the signal would be a "0." Lines 73, 73′....$73^m$ leading from units 60, 60′....$60^m$ transmit the actual difference between the sum in each response accumulator and the predetermined threshold value for a purpose to be discussed below.

The manner in which the present pattern recognition computer is trained will now be discussed. When a pattern is presented to sensor 14 for the first time, one or more response signals will be developed at indicators 64, 64′....$64^m$. The exact signals and their sequence cannot be determined nor anticipated. If these signals are then taken as indicative of the presented pattern, the same signals should be developed each time that pattern is presented. Whenever a response to a pattern is other than the desired response, one of switches 74, 74′....$74^m$ would be closed on one of contacts 78, 78′....$78^m$ of gating units 80, 80′....$80^m$. The actuation of switches 74, 74′....$74^m$ can be automatic in response to a comparator that compares the actual response with the correct response or it can be manual through an operator. The gating units are adapted to transmit severally the differences, called the "error signals," between the sums in the response accumulators and the predetermined threshold values via lines 73, 73′....$73^m$ to a distributor 82 via lines 84, 84′....$84^m$. A "not" amplifier 75 is located in a branch of each of the lines 73, 73′....$73^m$, and functions to reverse the polarity of the error signal. Distributor 82 is adapted to transmit one of the signals from lines 84, 84′....$84^m$ to arithmetic elements depicted generally by numeral 100. A control line 83 from counter and logic unit 42 is provided to transmit an actuating signal to the distributor 82.

Arithmetic elements 100 comprises a divider unit 85 and an arithmetic summing unit 90. Divider unit 85 develops an output which comprises a number that is the error signal divided by the number of active association units as presented thereto from counter 54 via line 86, which output is adapted to be added to the weights of the active association units that contribute to the incorrect response. To this end, summing unit 90 reads out the weights of the association units from track 22 via line 92. These weight values are then combined with the signal from divider 85 via line 87 developing new weights that are returned via line 94.

A gate 95 is provided in line 84 and is responsive to a signal from activity track 24 depicted at 97 for allowing the new weight to be returned to tracks 22 only for those association units that are active. If more than one of the response signals from indicators 64, 64′....$64^m$ is incorrect, the above process of correction is repeated sequentially. Alternatively, "$m$" number of arithmetic elements 100 can be provided for parallel operation. With these new weights the computer will correctly recognize the original pattern whenever it is presented. But this does not means that it will not erroneously identify a new pattern as the old one. In order to fully train the computer it must be shown a number of different patterns with the weights adjusted until correct responses are achieved for all the presented patterns. Naturally, the speed of convergence toward correct responses depends on the manner in which the weights are adjusted.

One formula for adjusting the weights can be, for example, to each active association unit weight is added algebraically a number that is equal to minus twice the error signal divided by the number of active association units, and where the error signal is zero, it will be assumed to be a small number such as one-half.

A simplified example, using the above formula, now follows. It will be assumed that the computer contains only two association units $A_1$ and $A_2$, and one response unit R. $A_1$, for example, could correspond to subtrack association unit $18^1$ on drum 16 in FIG. 1 and $A_2$ could correspond to subtrack association unit 18″ thereon. Response unit R could correspond to response accumulator 56 in FIG. 1. A response of "1" will be indicated whenever the "error," $\theta$, is positive and a response of "0" will occur whenever the error is negative. The error signal $\theta$ could be transmitted from threshold 60 via gate 80, for example, in FIG. 1. As pointed out above, whenever $\theta$ equals zero, it will be treated as equaling one-half. The patterns used for training will be a "B," and a not $B_1$, denoted as "$B_1$"; and a not $B_2$, denoted as "$\overline{B}_2$". Whenever a "B" is presented to memory unit 10 via sensor 14 in FIG. 1, $A_1$ will be active and $A_2$ will be inactive, depicted as "1" and "o," respectively. Whenever a "$\overline{B}_1$" is presented, $A_1$ will be inactive and $A_2$ will be active, depicted as "0" and "1," respectively. Whenever a "$\overline{B}_2$" is presented, $A_1$ will be active and $A_2$ will be active, depicted as "1" and "1," respectively.

As shown in FIG. 2, it has been assumed that the weights, $W_1$ and $W_2$ are initially at zero when a "B" is presented. $W_1$ could be the weight from association unit $A_1$ ($18^1$ in FIG. 1) for response accumulator 56 and could be stored on weight track line $29^1$ in FIG. 1. $W_2$ could be the weight from association unit $A_2$ ($18''$ in FIG. 2) for response accumulator 56 and could be stored on weight track line $29''$ (not illustrated) immediately following weight track lines $29^1$ in FIG. 1. $A_1$ is active so that only $W_1$ is transferred to the response accumulator; via line 66 and distributor 48 but since $W_1$ is 0, the sum in R is 0. Thresholds of one will be assumed throughout, and therefore $\theta$ equals $(0-1)$ or $-1$. This signal is negative so that the actual response will be recorded as " 0," which is incorrect. In FIG. 1 this signal would appear at 73 and 64. The weight, $W_1$, that contributed to this incorrect response is changed by adding $2\theta/A_1+A_2$ or 2, in this case. The change would occur through gate 80, distributor 82, arithmetic unit 100, line 94, gate 95 to weight track 22 in FIG. 1. The weight, $W_2$, is unchanged, since its association unit, $A_2$, is inactive. A "$\overline{B}_1$"is presented, with the new weight $W_1$ being 2 and the old weight of $W_2$ still remaining zero. Now $A_2$ is active therefore $W_2$ is transferred. The sum in R is still zero and the error is $-1$ as before. The error is negative therefore, the response is "0," which is correct. The weights remain the same and a "$\overline{B}_2$" is presented. Here, $A_1$ and $A_2$ are active, so $W_1$ and $W_2$ are transferred, making a sum in R of 2. The difference between the sum in R and the threshold is one, which is positive giving a response of "1." This is correct and $W_1$ and $W_2$ are changed by subtracting a one from each, making $W_1$ and $W_2$ one and minus one, respectively. A "B" is again presented and $W_1$ is transferred making one the sum in R. The error, $\theta$, is equal to zero and in accordance with the rule presented above it is changed to one-half. With $\theta$ equal to one-half, $W_1$ has to be changed by minus one. A "$\overline{B}_1$" is presented giving a correct response; therefore, the weights remain unchanged. A "$\overline{B}_2$" is presented giving a correct response of "0" and the weights are again unchanged. A "B" is presented giving an incorrect response of "0" and $W_1$ is changed by adding two thereto. A "$\overline{B}_1$"is again presented giving a correct response of " 0." A "$\overline{B}_2$"is then presented with a resultant $\theta$ equal to zero, which is changed as before to one-half and the weights are changed by subtracting one-half therefrom. With a "B" presented, the response is "1" which is correct. A "$\overline{B}_1$" is presented next, resulting in a correct response of "0." A correct response of "0" also results when a "$\overline{B}_2$" is presented. Thus, there has been a correct response for each stimuli without changing any weights. The weights so developed, $W_1=1.5$ and $W_2=-1.5$ are those required for the computer to recognize the presence of a "B" or the absence thereof from the class "B," "$\overline{B}_1$" and "$\overline{B}_2$." The computer has been fully trained for this function. It is important to note that at no time were the images of a "B" stored for comparison with the stimuli. Instead, the property of the patterns consists of a set of weights; two, in the simplified example and thousands in actual practice.

Although a drum storage has been shown in FIG. 1 any type of storage device can be utilized as for example core memories or delay lines. In addition, random access memories can be used to store various quantities as the association unit activities, for example. It is also contemplated that the parallel response accumulators 56, 56′....$56^m$ can be replaced with a single accumulator that stores the weight sums for all the responses sequentially whereby the indicators, flip-flops, for example, would be actuated sequentially.

The various accumulators, threshold and distributors are conventional digital components, and have therefore been depicted, for simplicity and ease in presentation, as functional blocks. For example, the accumulators can be digital flip-flop registers and digital adders; the thresholds can be a series of digital switches for selecting highest order bits in the accumulators associated therewith; and the distributors can be gating circuits that direct an incoming signal to one of several outputs or vice versa.

Other variations are possible without departing from the spirit of the present invention. Therefore, it is intended that the invention is to be limited only by the scope of the appended claims.

We claim:

1. A pattern recognition computer comprising in combination;

a. sensor responsive to a presented pattern, b. means defining a plurality of memory elements each adapted to accept and store a portion of the pattern presented to said sensor means, c. a plurality of association units, each comprising first digital storage means containing the addresses of a random number of said memory elements, d. accumulator means operatively associated with said memory elements for collecting and summing the content thereof in response to a signal derived from said storage means, e. threshold means operatively associated with said last mentioned means for developing an activity signal whenever the content of said last mentioned means exceeds a predetermined value, f. means for actuating said threshold means as soon as all the memory elements associated with each of said association units are fully addressed, g. response accumulator means, h. second digital storage means containing at least one predetermined weight value for each association unit, i. means responsive to said activity signal from said threshold means and operatively associated with said last mentioned digital storage means for delivering to said response accumulator means weight values from said last mentioned digital storage means, and j. response threshold means operatively associated with said response accumulator means for developing an output signal indicative of the difference between the content of said accumulator means and a predetermined value.

2. The computer according to claim 1 further comprising;

k. means for changing each of said predetermined weight values in accordance with a predetermined formula.

3. The computer according to claim 2 wherein said last mentioned means includes;

l. gating means, m. arithmetic means, n. said gating means adapted to transmit the contents of at least one of said response threshold means to said arithmetic means, and o. said arithmetic means being adapted to replace at least one of said predetermined weight values with new weight values.

4. The computer according to claim 1 wherein:

k. said first digital storage means is a drum memory, and l. said addresses that are assigned to any one of said association units are each located adjacent each other on adjacent rows of said drum.

5. The computer according to claim 4 wherein;

m. said second digital storage means is a portion of said drum memory, and n. said weight values for the *n*th association unit occupying tracks on said drum that are located adjacent the address tracks for the $n+1$ association unit, where $n$ is a whole number.